United States Patent
Naoi et al.

(10) Patent No.: US 11,450,344 B2
(45) Date of Patent: Sep. 20, 2022

(54) MAGNETIC RECORDING MEDIUM, MAGNETIC RECORDING AND REPRODUCING DEVICE, AND E-IRON OXIDE POWDER

(71) Applicant: FUJIFILM Corporation, Tokyo (JP)

(72) Inventors: Kenji Naoi, Minami-ashigara (JP); Koichi Yagishita, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/986,877

(22) Filed: Aug. 6, 2020

(65) Prior Publication Data
US 2021/0043227 A1 Feb. 11, 2021

(30) Foreign Application Priority Data

Aug. 9, 2019 (JP) .............................. JP2019-148127

(51) Int. Cl.
*G11B 5/706* (2006.01)
*G11B 5/714* (2006.01)
*G11B 5/008* (2006.01)
*G11B 5/708* (2006.01)
*G11B 5/735* (2006.01)

(52) U.S. Cl.
CPC ...... *G11B 5/70678* (2013.01); *G11B 5/00813* (2013.01); *G11B 5/7085* (2013.01); *G11B 5/714* (2013.01); *G11B 5/735* (2013.01)

(58) Field of Classification Search
CPC ............ G11B 5/00813; G11B 5/70678; G11B 5/7085; G11B 5/714; G11B 5/735; G11B 5/70642; G11B 5/7356
See application file for complete search history.

(56) References Cited

U.S. PATENT DOCUMENTS

| 2010/0171066 A1* | 7/2010 | Ohkoshi | C01G 45/006 252/62.57 |
| 2014/0212693 A1* | 7/2014 | Hattori | G11B 5/733 428/832 |

FOREIGN PATENT DOCUMENTS

JP  2008-063201 A  3/2008

* cited by examiner

*Primary Examiner* — Holly Rickman
*Assistant Examiner* — Linda N Chau
(74) *Attorney, Agent, or Firm* — Sughrue Mion, PLLC

(57) ABSTRACT

The magnetic recording medium includes a non-magnetic support; and a magnetic layer including a ferromagnetic powder, in which the ferromagnetic powder is an ε-iron oxide powder having an average particle size of 9.0 nm to 20.0 nm, and in the ε-iron oxide powder, a content of particles having a particle size smaller than 8.0 nm is less than 20.0% by mass, a content of particles having a particle size smaller than 6.0 nm is less than 5.0% by mass, and a content of particles having a particle size greater than 25.0 nm is less than 20.0% by mass.

9 Claims, No Drawings

MAGNETIC RECORDING MEDIUM, MAGNETIC RECORDING AND REPRODUCING DEVICE, AND E-IRON OXIDE POWDER

CROSS-REFERENCE TO RELATED APPLICATIONS

This application claims priority under 35 U.S.C 119 to Japanese Patent Application No. 2019-148127 filed on Aug. 9, 2019. The above application is hereby expressly incorporated by reference, in its entirety, into the present application.

BACKGROUND OF THE INVENTION

1. Field of the Invention

The present invention relates to a magnetic recording medium, a magnetic recording and reproducing device, and ε-iron oxide powder.

2. Description of the Related Art

In recent years, as a ferromagnetic powder used in a magnetic recording medium, an ε-iron oxide powder is attracting attention (for example, see JP2008-063201A).

SUMMARY OF THE INVENTION

In general, a magnetic recording medium runs in a magnetic recording and reproducing device to bring a surface of a magnetic layer and a magnetic head into contact to slide on each other, and accordingly, the data recorded on the magnetic recording medium is read and reproduced by the magnetic head. In addition, running of the magnetic recording medium is repeated, and data recorded on the magnetic recording medium is repeatedly reproduced. It is desirable to exhibit excellent electromagnetic conversion characteristics not only at the beginning of running but also after repeated running, in order to increase the usefulness of a magnetic recording medium as a recording medium for data storage.

In addition, in order to increase the usefulness of the magnetic recording medium as a recording medium for data storage, it is also desirable to have a less decrease in reproduction output, in a case where data is continuously or intermittently reproduced by repeating the running of the magnetic recording medium.

In consideration of these circumstances, the inventors of the invention have conducted research regarding a change in electromagnetic conversion characteristics of a magnetic recording medium including an ε-iron oxide powder in a magnetic layer and a reproduction output in the repeated reproduction. As a result, the inventors have thought that further improvement of a magnetic recording medium of the related art including an ε-iron oxide powder in a magnetic layer is desired, from a viewpoint of improving electromagnetic conversion characteristics in an initial stage of running and after repeated running and preventing a decrease in reproduction output.

An aspect of the invention provides for a magnetic recording medium including an ε-iron oxide powder in a magnetic layer, and having excellent electromagnetic conversion characteristics in an initial stage of running and after repeated running and having less decrease in reproduction output.

According to an aspect of the invention, there is provided a magnetic recording medium comprising:
a non-magnetic support; and a magnetic layer including a ferromagnetic powder, in which the ferromagnetic powder is an ε-iron oxide powder having an average particle size of 9.0 nm to 20.0 nm, and in the ε-iron oxide powder, a content of particles having a particle size smaller than 8.0 nm is less than 20.0% by mass, a content of particles having a particle size smaller than 6.0 nm is less than 5.0% by mass, and a content of particles having a particle size greater than 25.0 nm is less than 20.0% by mass.

According to an aspect of the invention, there is provided an ε-iron oxide powder, in which an average particle size is 9.0 nm to 20.0 nm, a content of particles having a particle size smaller than 8.0 nm is less than 20.0% by mass, a content of particles having a particle size smaller than 6.0 nm is less than 5.0% by mass, and a content of particles having a particle size greater than 25.0 nm is less than 20.0% by mass.

In one aspect, in the ε-iron oxide powder, the content of the particles having a particle size smaller than 8.0 nm may be 8.0% by mass or more and less than 20.0% by mass.

In one aspect, in the ε-iron oxide powder, the content of the particles having a particle size smaller than 6.0 nm may be 3.0% by mass or more and less than 5.0% by mass.

In one aspect, in the ε-iron oxide powder, the content of the particles having a particle size greater than 25.0 nm may be 8.0% by mass or more and less than 20.0% by mass.

In one aspect, the ε-iron oxide powder contains one or more kinds of element selected from the group consisting of a gallium element, a cobalt element, and a titanium element.

In one aspect, the magnetic recording medium may further include a non-magnetic layer including a non-magnetic powder between the non-magnetic support and the magnetic layer.

In one aspect, the magnetic recording medium may further include a back coating layer including a non-magnetic powder on a surface of the non-magnetic support opposite to a surface provided with the magnetic layer.

In one aspect, the magnetic recording medium may be a magnetic tape.

According to another aspect of the invention, there is provided a magnetic recording and reproducing device comprising: the magnetic recording medium; and a magnetic head.

according to one aspect of the invention, it is possible to provide a magnetic recording medium including an ε-iron oxide powder in a magnetic layer, and having excellent electromagnetic conversion characteristics in an initial stage of running and after repeated running and having less decrease in reproduction output. In addition, according to another aspect of the invention, it is possible to provide a magnetic recording and reproducing device including such a magnetic recording medium. In addition, according to still another aspect of the invention, it is possible to provide an ε-iron oxide powder suitable for producing the magnetic recording medium.

DESCRIPTION OF THE PREFERRED EMBODIMENTS

Magnetic Recording Medium

One embodiment of the invention relates to a magnetic recording medium including: a non-magnetic support; and a magnetic layer including a ferromagnetic powder, in which the ferromagnetic powder is an ε-iron oxide powder having an average particle size of 9.0 nm to 20.0 nm, and in the ε-iron oxide powder, a content of particles having a particle size smaller than 8.0 nm is less than 20.0% by mass, a content of particles having a particle size smaller than 6.0 nm is less than 5.0% by mass, and a content of particles having a particle size greater than 25.0 nm is less than 20.0% by mass.

The magnetic recording medium includes an ε-iron oxide powder as a ferromagnetic powder of the magnetic layer. In the invention and the specification, the "ε-iron oxide powder" is a ferromagnetic powder having an ε-iron oxide type crystal structure (ε phase) detected as a main phase by an X-ray diffraction analysis. For example, in a case where the diffraction peak of the highest hardness in the X-ray diffraction spectrum obtained by the X-ray diffraction analysis is belonged to the ε-iron oxide type crystal structure (ε phase), it is determined that the ε-iron oxide type crystal structure is detected as a main phase. An a phase and/or a γ phase may or may not be included, in addition to the ε phase of the main phase. The ε-iron oxide powder in the invention and the specification includes a so-called unsubstituted ε-iron oxide powder configured with iron and oxygen, and a so-called substituted ε-iron oxide powder including one or more kinds of substitutional elements for substituting iron.

JP2008-063201A mentioned above discloses that, in an ε-iron oxide powder, an average particle diameter of is 10 to 200 nm and a number ratio of particles having a particle diameter less than 10 nm is 25% or less (see claim 1 of JP2008-063201A).

On the other hand, the inventors have studied and found that only simply decreasing the ratio of the particles having a small particle size (hereinafter, referred to as "fine particle component") regarding the ε-iron oxide powder as disclosed in JP2008-063201A is insufficient to provide a magnetic recording medium having excellent electromagnetic conversion characteristics in an initial stage of running and after repeated running and having less decrease in reproduction output. As a result of further intensive studies, the inventors have newly found that, in addition to a decrease in the ratio of the fine particle component, a reduction in ratio of particles having a particularly small particle size (hereinafter, referred to as "ultrafine particle component") among the fine particle components and a decrease in ratio of particles having a larger particle size (hereinafter, referred to as "coarse particle component") can contribute to improvement of excellent electromagnetic conversion characteristics in an initial stage of running and after repeated running and prevention of a decrease in reproduction output, in the magnetic recording medium including the ε-iron oxide powder in the magnetic layer. In contrast, JP2008-063201A merely discloses that the number of fine particle component should be reduced and does not disclose about the reduction of ultrafine particle components or the reduction of the coarse particle components.

Hereinafter, the magnetic recording medium will be further described in detail.

ε-Iron Oxide Powder

Average Particle Size

The average particle size of the ε-iron oxide powder included in the magnetic layer of the magnetic recording medium is 9.0 nm to 20.0 nm, from viewpoints of improving the electromagnetic conversion characteristics in the initial stage of running and after repeated running and preventing a decrease in reproduction output. From the above viewpoint, the average particle size of the ε-iron oxide powder is preferably equal to or greater than 10.0 nm, more preferably equal to or greater than 11.0 nm, and even more preferably equal to or greater than 12.0 nm. In addition, mainly, from a viewpoint of further improving electromagnetic conversion characteristics in an initial stage of running and after repeated running, the average particle size of the ε-iron oxide powder is preferably equal to or smaller than 19.0 nm, more preferably equal to or smaller than 18.0 nm, even more preferably equal to or smaller than 17.0 nm, still preferably equal to or smaller than 16.0 nm, and still more preferably equal to or smaller than 15.0 nm.

In the invention and the specification, average particle sizes of various powder such as the ε-iron oxide powder and the like are values measured by the following method with a transmission electron microscope, unless otherwise noted.

The powder is imaged at an imaging magnification ratio of 100,000 with a transmission electron microscope, the image is printed on photographic printing paper or displayed on a display so that the total magnification ratio of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetical mean of the particle size of 500 particles obtained as described above is an average particle size of the powder. In addition, the content of particles of the ε-iron oxide powder having various particle sizes is obtained using 500 particles obtained here.

As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted. In the invention and the specification, the powder means an aggregate of a plurality of particles. For example, the ferromagnetic powder means an aggregate of a plurality of ferromagnetic particles. The aggregate of a plurality of particles is not limited to an embodiment in which particles configuring the aggregate directly come into contact with each other, but also includes an embodiment in which a binding agent, an additive, or the like which will be described later is interposed between the particles. A term, particles may be used for representing the powder.

As a method of collecting a sample powder from the magnetic recording medium in order to measure the particle size, a method disclosed in a paragraph 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, in a case of the definition (2), the average particle size is an average plate diameter. In a case of the definition (3), the average particle size is an average diameter (also referred to as an average particle diameter).

Content of Particles Having Various Particle Sizes

Regarding the ε-iron oxide powder included in the magnetic layer of the magnetic recording medium, the average particle size is in the range described above, a content of particles having a particle size smaller than 8.0 nm is less than 20.0% by mass, a content of particles having a particle size smaller than 6.0 nm is less than 5.0% by mass, and a content of particles having a particle size greater than 25.0 nm is less than 20.0% by mass. The particles having a particle size smaller than 8.0 nm can be referred to as fine particle components, and among these fine particle components, particles having a particle size smaller than 6.0 nm can be referred to as ultrafine particle components. In addition, the particles having a particle size greater than 25.0 nm can be referred to as coarse particle components. The contents of these various components within the above ranges can contribute to the improvement of the electromagnetic conversion characteristics of the magnetic recording medium at the initial stage of running and after repeated running and prevention of a decrease in reproduction output.

The content of the particles having a particle size smaller than 8.0 nm is less than 20.0% by mass, and mainly, from a viewpoint of further improving electromagnetic conversion characteristics after repeated running, the content thereof is preferably 19.5% by mass or less, more preferably 19.0% by mass or less, even more preferably 18.5% by mass or less, and still preferably 18.0% by mass or less. In addition, the content of particles having a particle size smaller than 8.0 nm can be, for example, 0% by mass or more, 1.0% by mass or more, 3.0% by mass or more, 5.0% by mass or more, 8.0% by mass or more, or 10.0% by mass or more.

The particles having a particle size smaller than 8.0 nm may include particles having a particle size smaller than 6.0 nm. In the ε-iron oxide powder included in the magnetic layer of the magnetic recording medium, the content of particles having a particle size smaller than 6.0 nm is less than 5.0% by mass, and mainly, from a viewpoint of further preventing a decrease in reproduction output and further improving the electromagnetic conversion characteristics after repeated running, the content thereof is preferably 4.9% by mass or less and more preferably 4.8% by mass or less. It is even more preferably 4.7% by mass or less and still preferably 4.6% by mass or less. In addition, the content of particles having a particle size smaller than 6.0 nm can be, for example, 0% by mass or more, 1.0% by mass or more, 2.0% by mass or more, 3.0% by mass or more, or 3.5% by mass or more.

The content of the particles having a particle size greater than 25.0 nm is less than 20.0% by mass, and mainly, from a viewpoint of further improving electromagnetic conversion characteristics in the initial stage of running and after repeated running, the content thereof is preferably 19.5% by mass or less, more preferably 19.0% by mass or less, even more preferably 18.5% by mass or less, still preferably 18.0% by mass or less, and still more preferably 17.5% by mass or less. In addition, the content of particles having a particle size greater than 25.0 nm can be, for example, 0% by mass or more, 1.0% by mass or more, 3.0% by mass or more, 5.0% by mass or more, 8.0% by mass or more, or 10.0% by mass or more.

The average particle size and the contents of particles having various particle sizes of the ε-iron oxide powder can be adjusted depending on the producing conditions of the ε-iron oxide powder or the like. This will be further described later.

Producing Method of ε-Iron Oxide Powder

As a producing method of the ε-iron oxide powder, a producing method from a goethite, a reverse micelle method, and the like are known. All of the producing methods are well known. In addition, for the method of producing the ε-iron oxide powder in which a part of Fe is substituted with substitutional elements such as Ga, Co, Ti, Al, or Rh, a description disclosed in J. Jpn. Soc. Powder Metallurgy Vol. 61 Supplement, No. 51, pp. S280-S284, J. Mater. Chem. C, 2013, 1, pp. 5200-5206 can be referred to, for example.

As an example, the ε-iron oxide powder included in the magnetic layer of the magnetic recording medium can be obtained by a producing method of obtaining an ε-iron oxide powder, for example, through preparing a precursor of an ε-iron oxide (hereinafter, also referred to as a "precursor preparation step"), performing a coating forming process with respect to the precursor (hereinafter, also referred to as a "coating forming step"), converting the precursor into ε-iron oxide by performing heat treatment with respect to the precursor after the coating forming step (hereinafter, also referred to as a "heat treatment step"), and performing coating removing process with respect to the ε-iron oxide (hereinafter, also referred to as a "coating removing step").

Hereinafter, such a producing method will be further described. Here, the producing method described hereinafter is merely an example, and the ε-iron oxide powder described above is not limited to an ε-iron oxide powder produced by the producing method shown below.

Precursor Preparation Step

The precursor of the ε-iron oxide is a material which includes an ε-iron oxide type crystal structure as a main phase by being heated. The precursor can be hydroxide or oxyhydroxide (oxide hydroxide) containing an element in which iron and a part of iron in the crystal structure can be substituted. The precursor preparation step can be performed by using a coprecipitation method or a reverse micelle method. Such a preparing method of the precursor is well known and the precursor preparation step of the producing method can be performed by a well-known method. For example, regarding the preparation method of the precursor, well-known technologies disclosed in paragraphs 0017 to 0021 and examples of JP2008-174405A, paragraphs 0025 to 0046 and examples of WO2016/047559A1, and paragraphs 0038 to 0040, 0042, 0044 to 0045, and examples of WO2008/149785A1.

The ε-iron oxide not containing a substitutional element substituted with a part of iron can be represented by a compositional formula: $Fe_2O_3$. Meanwhile, the ε-iron oxide in which a part of iron is substituted with, for example, one to three kinds of the elements, can be represented by a compositional formula: $A^1_x A^2_y A^3_z Fe_{(2-x-y-z)}O_3$. $A^1$, $A^2$, and $A^3$ each independently represent a substitutional element substituted with iron, x, y, and z is each independently equal to or greater than 0 and smaller than 1, here, at least one thereof is greater than 0, and x+y+z is smaller than 2. The ε-iron oxide powder may or may not contain a substitutional element substituted with iron. Magnetic properties of the ε-iron oxide powder can be adjusted depending on the type and the substitution amount of the substitutional element. In a case where the substitutional element is included, one or more kinds of Ga, Al, In, Rh, Mn, Co, Ni, Zn, Ti, Sn and the like can be used as the substitutional element. For example, in the above compositional formula, $A^1$ can be Ga, Al, In, or Rh, $A^2$ can be Mn, Co, Ni, or Zn, and $A^3$ can be Ti or Sn. As the substitutional element, one or more kinds of Ga, Co, and Ti are preferable. In a case of producing the ε-iron oxide powder containing a substitutional element substituted with iron, a part of a compound which is a supply source of Fe of the ε-iron oxide may be substituted with a compound of the substitutional element. A composition of the obtained ε-iron oxide powder can be controlled in accordance with the substitution amount thereof. Examples of the compound which is a supply source of iron and various substitutional elements include an inorganic salt (may be hydrate) such as nitrate, sulfate, or chloride, an organic salt (may be hydrate) such as pentakis (hydrogen oxalate) salt, hydroxide, and oxyhydroxide.

Coating Forming Step

In a case of heating the precursor after the coating forming process, the reaction of converting the precursor into ε-iron oxide can proceed under the coating. In addition, the coating may be considered to play a role of preventing occurrence of sintering during the heating. From a viewpoint of ease of coating forming, the coating forming process is preferably performed in a solution and more preferably performed by adding a coating formation agent (compound for coating forming) to a solution containing the precursor. For example, in a case of performing the coating forming process in the same solution after the preparation of the precursor, the coating can be formed on the precursor by adding and stirring the coating formation agent to the solution after the preparation of the precursor. As a coating preferable from a viewpoint of ease of forming the coating on the precursor in the solution, a silicon-containing coating can be used. As the coating formation agent for forming the silicon-containing coating, for example, a silane compound such as alkoxysilane can be used. The silicon-containing coating can be formed on the precursor by hydrolysis of the silane compound preferably using a sol-gel method. Specific examples of the silane compound include tetraethyl orthosilicate (TEOS), tetramethoxysilane, and various silane coupling agents. For the coating forming process, for example, well-known technologies disclosed in paragraph 0022 and examples of JP2008-174405A, paragraphs 0047 to 0049 and examples of WO2016/047559A1, paragraphs 0041 and 0043 and examples of WO2008/149785A1. For example, the coating forming process can be performed by stirring a solution including the precursor and the coating formation agent at a liquid temperature of 50° C. to 90° C. for approximately 5 to 36 hours. The coating may be coated over the entire surface of the precursor or a part of the surface of the precursor which is not coated with the coating may be included.

Heat Treatment Step

By performing the heat treatment with respect to the precursor after the coating forming process, the precursor can be converted into ε-iron oxide. The heat treatment can be performed with respect to a powder collected form a solution subjected to the coating forming process (powder of the precursor including the coating). For the heat treatment step, for example, well-known technologies disclosed in a paragraph 0023 and examples of JP2008-174405A, a paragraph 0050 and examples of WO2016/047559A1, and paragraphs 0041 and 0043 and examples of WO2008/149785A1. The heat treatment step can be performed, for example, in a heat treatment furnace at a furnace inner temperature of 900° C. to 1,200° C. for approximately 3 to 6 hours. As the heat treatment step is performed at a higher temperature and/or the heat treatment time is longer, the average particle size of the obtained ε-iron oxide powder tends to increase.

Coating Removing Step

By performing the heat treatment step, the precursor including the coating can be converted into ε-iron oxide. The coating remains on the ε-iron oxide obtained as described above, and accordingly, the coating removing process is preferably performed. For the coating removing process, for example, well-known technologies disclosed in a paragraph 0025 and examples of JP2008-174405 and a paragraph 0053 and examples of WO2008/149785A1. The coating removing process can be, for example, performed by stirring the ε-iron oxide including the coating in a sodium hydroxide aqueous solution having a concentration of approximately 4 mol/L at a liquid temperature of approximately 60° C. to 90° C. for 5 to 36 hours. Here, the ε-iron oxide powder according to one embodiment of the invention may be produced without the coating removing process, that is, may include the coating. In addition, the coating may not be completely removed in the coating removing process and a part of coating may remain.

A well-known step can also be randomly performed before and/or after various steps described above. As such a step, various well-known steps such as classification, filtering, washing, and drying can be used, for example. For example, the classification can be performed by a well-known classification process such as centrifugation, decantation, or magnetic separation. For example, it is possible to adjust the contents of the particles having various particle sizes of the ε-iron oxide powder, by adjusting the classification conditions (for example, the number of times of treatments, the treatment time, the centrifugal force applied in the centrifugation, the magnetic field strength in the magnetic separation method, the frequency in the case of an AC magnetic field, and the like). For example, after centrifugation, among the particles having various particle sizes, particles having a larger particle size tend to precipitate, and particles having a smaller particle size tend to be dispersed in a supernatant. Therefore, for example, in a case where it is desirable to remove particles having a smaller particle size, it is preferable to collect the precipitate after centrifugation. On the other hand, for example, in a case where it is desirable to remove particles having a larger particle size, it is preferable to collect the supernatant after centrifugation.

Hereinafter, the magnetic layer and the like of the magnetic recording medium will be described in detail.

Magnetic Layer

Ferromagnetic Powder

The magnetic recording medium includes an ε-iron oxide powder as a ferromagnetic powder of the magnetic layer. The details of the ε-iron oxide powder are as described above. A content (filling percentage) of the ferromagnetic powder in the magnetic layer is preferably 50% to 90% by mass and more preferably 60% to 90% by mass. A high filling percentage of the ferromagnetic powder in the magnetic layer is preferable from a viewpoint of improvement of recording density.

Binding Agent

The magnetic recording medium can be a coating type magnetic recording medium and include a binding agent in the magnetic layer. The binding agent is one or more resins. As the binding agent, various resins usually used as a binding agent for a coating type magnetic recording medium can be used. As the binding agent, for example, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, polyvinyl acetal, and a polyvinyl alkylal resin such as polyvinyl butyral can be used alone or a plurality of resins can be mixed with each other to be used. Among these, a polyurethane resin, an acrylic resin, a cellulose resin, and a vinyl chloride resin are preferable. These resins may be a homopolymer or a copolymer. These resins can be used as the binding agent even in the non-magnetic layer and/or a back coating layer which will be described later. The content of the binding agent can be, for example, 1.0 to 30.0 parts by mass with respect to 100.0 parts by mass of the ferromagnetic powder. For the binding agent, description disclosed in paragraphs 0028 to 0031 of JP2010-024113A can be also referred to. An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC) under the following measurement conditions. The weight-average molecular weight of the binding agent shown in examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

In addition, a curing agent can also be used together with the resin which can be used as the binding agent. As the curing agent, in one embodiment, a thermosetting compound which is a compound in which a curing reaction (crosslinking reaction) proceeds due to heating can be used, and in another embodiment, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in a magnetic layer forming step. The same also applies to a layer formed using this composition, in a case where a composition used for forming other layers include the curing agent. The preferred curing agent is a thermosetting compound, polyisocyanate is suitable. For details of the polyisocyanate, descriptions disclosed in paragraphs 0124 and 0125 of JP2011-216149A can be referred to, for example. A content of the curing agent in the magnetic layer forming composition can be, for example, 0 to 80.0 parts by mass and can be 50.0 to 80.0 parts by mass, from a viewpoint of improving hardness of the magnetic layer, with respect to 100.0 parts by mass of the binding agent.

Additives

The magnetic layer may include one or more kinds of additives, as necessary. As an example of the additive, the curing agent is used. Examples of the additive included in magnetic layer include a non-magnetic powder (for example, inorganic powder, carbon black, or the like), a lubricant, a dispersing agent, a dispersing assistant, an antibacterial agent, an antistatic agent, and an antioxidant. For example, for the lubricant, a description disclosed in paragraphs 0030 to 0033, 0035, and 0036 of JP2016-126817A can be referred to. The lubricant may be included in the non-magnetic layer which will be described later. For the lubricant which can be included in the non-magnetic layer, a description disclosed in paragraphs 0030, 0031, 0034, 0035, and 0036 of JP2016-126817A can be referred to. For the dispersing agent, a description disclosed in paragraphs 0061 and 0071 of JP2012-133837A can be referred to. The dispersing agent may be added to a non-magnetic layer forming composition. For the dispersing agent which can be added to the non-magnetic layer forming composition, a description disclosed in paragraph 0061 of JP2012-133837A can be referred to. Examples of the non-magnetic powder that can be included in the magnetic layer include a non-magnetic powder that can function as an abrasive, and a non-magnetic powder that can function as a projection formation agent that forms projections that appropriately project on the surface of the magnetic layer. (for example, non-magnetic colloid particles). An average particle size of colloidal silica (silica colloidal particles) shown in examples which will be described later is a value obtained by a method disclosed as a method for measuring the average particle size in paragraph 0015 of JP2011-048878A. As the additives, a commercially available product can be suitably selected according to the desired properties or manufactured by a well-known method, and can be used with any amount. As an example of the additive which can be used in the magnetic layer including the abrasive for improving dispersibility of the abrasive, a dispersing agent disclosed in paragraphs 0012 to 0022 of JP2013-131285A can be used.

The magnetic layer described above can be provided directly on the surface of the non-magnetic support or indirectly via the non-magnetic layer.

Non-Magnetic Layer

Next, the non-magnetic layer will be described. The magnetic recording medium may include a magnetic layer directly on the surface of the non-magnetic support, or may include a magnetic layer on the surface of the non-magnetic support via a non-magnetic layer including a non-magnetic powder. The non-magnetic powder used in the non-magnetic layer may be an inorganic powder or an organic powder. In addition, carbon black and the like can be used. Examples of the inorganic powder include powders of metal, metal oxide, metal carbonate, metal sulfate, metal nitride, metal carbide, and metal sulfide. These non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, a description of paragraphs 0040 and 0041 of JP2010-024113A can be referred to. The content (filling percentage) of the non-magnetic powder of the non-magnetic layer is preferably 50% to 90% by mass and more preferably 60% to 90% by mass.

The non-magnetic layer can include a binding agent and can also include additives. In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

The non-magnetic layer in the invention and the specification also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 100 Oe, or a layer having a residual magnetic flux density equal to or smaller than 10 mT and coercivity equal to or smaller than 100 Oe. It is preferable that the non-magnetic layer does not have a residual magnetic flux density and coercivity.

Non-Magnetic Support

Next, the non-magnetic support will be described. As the non-magnetic support (hereinafter, also simply referred to as a "support"), well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heating treatment may be performed with respect to these supports in advance.

Back Coating Layer

The magnetic recording medium may also include or may not include a back coating layer including a non-magnetic powder on a surface of the non-magnetic support opposite to the surface provided with the magnetic layer. The back coating layer preferably includes one or both of carbon black and inorganic powder. The back coating layer can include a binding agent or can also include additives. In regards to the binding agent and the additives the back coating layer, a well-known technology regarding the back coating layer can be applied, and a well-known technology regarding the list of the magnetic layer and/or the non-magnetic layer can also be applied. For example, for the back coating layer, descriptions disclosed in paragraphs 0018 to 0020 of JP2006-331625A and page 4, line 65, to page 5, line 38, of U.S. Pat. No. 7,029,774B can be referred to.

Various Thicknesses

A thickness of the non-magnetic support is, for example, 3.0 to 80.0 μm, preferably 3.0 to 20.0 μm, and even more preferably 3.0 to 10.0 μm.

A thickness of the magnetic layer can be optimized according to a saturation magnetization amount of a magnetic head used, a head gap length, a recording signal band, and the like, and the thickness thereof is generally 0.01 μm to 0.15 μm, and from a viewpoint of realizing high-density recording, preferably 0.02 μm to 0.12 μm, and more preferably 0.03 μm to 0.1 μm. The magnetic layer may be at least one layer, or the magnetic layer can be separated to two or more layers having different magnetic properties, and a configuration regarding a well-known multilayered magnetic layer can be applied. A thickness of the magnetic layer which is separated into two or more layers is a total thickness of the layers.

A thickness of the non-magnetic layer is, for example, 0.1 to 1.5 μm and preferably 0.1 to 1.0 μm.

A thickness of the back coating layer is preferably 0.9 μm or less and more preferably 0.1 to 0.7 μm.

The thicknesses of various layers and the non-magnetic support of the magnetic recording medium can be obtained by a well-known film thickness measurement method. As an example, a cross section of the magnetic recording medium in a thickness direction is exposed by a well-known method of ion beams or microtome, and the exposed cross section is observed with a scanning electron microscope. In the cross section observation, various thicknesses can be obtained as the thickness obtained at one portion, or as an arithmetical mean of thicknesses obtained at a plurality of portions which are two or more portions randomly extracted.

Producing Process

A step of preparing compositions for forming the magnetic layer, the non-magnetic layer, or the back coating layer generally includes at least a kneading step, a dispersing step, and a mixing step provided before and after these steps, as necessary. Each step may be divided into two or more stages. The component used in the preparation of each layer forming composition may be added at an initial stage or in a middle stage of each step. As the solvent, one or two or more kinds of various solvents usually used for producing a coating type magnetic recording medium can be used. For the solvent, descriptions disclosed in paragraph 0153 of JP2011-216149A can be referred to. In addition, each component may be separately added in two or more steps. For example, the binding agent may be added separately in the kneading step, the dispersing step, and the mixing step for adjusting the viscosity after the dispersion. In order to produce the magnetic recording medium, a well-known producing technology can be used in various steps. In the kneading step, an open kneader, a continuous kneader, a pressure kneader, or a kneader having a strong kneading force such as an extruder is preferably used. For details of the kneading processes, descriptions disclosed in JP1989-106338A (JP-H01-106338A) and JP1989-079274A (JP-H01-079274A) can be referred to. As a disperser, a well-known disperser can be used. At any stage of preparing each layer forming composition, the filtering may be performed by a well-known method. The filtering can be performed by using a filter, for example. As the filter used in the filtering, a filter having a hole diameter of 0.01 to 3 μm (for example, filter made of glass fiber or filter made of polypropylene) can be used, for example.

The magnetic layer can be formed, for example, by directly applying the magnetic layer forming composition onto the non-magnetic support or performing multilayer coating with the non-magnetic layer forming composition in order or at the same time. The back coating layer can be formed by applying the back coating layer forming composition on a side of the non-magnetic support opposite to a side provided with (or to be provided with) the magnetic layer. For details of the coating for forming each layer, paragraph 0051 of JP2010-24113A can be referred to.

After the coating step, various processes such as a drying treatment, a magnetic layer alignment process, and a surface smoothing treatment (calender process) can be performed. For various steps, for example, a well-known technology disclosed in paragraphs 0052 to 0057 of JP2010-024113A can be referred to. For example, it is preferable to perform the alignment process with respect to the coating layer of the magnetic layer forming composition while the coating layer is in a wet state. For the alignment process, various well-known technologies disclosed in a paragraph 0067 of JP2010-231843A can be applied. For example, a homeotropic alignment process can be performed by a well-known method such as a method using a different polar facing magnet. In the alignment zone, a drying speed of the coating layer can be controlled by a temperature, an air flow of the dry air and/or a transporting rate of the magnetic tape in the alignment zone. In addition, the coating layer may be preliminarily dried before transporting to the alignment zone.

A servo pattern can be formed on the magnetic recording medium produced as described above by a well-known method, in order to realize tracking control of a magnetic head of the magnetic recording and reproducing device and control of a running speed of the magnetic recording medium. The "formation of the servo pattern" can be "recording of a servo signal". The magnetic recording medium may be a tape-shaped magnetic recording medium (magnetic tape) or a disk-shaped magnetic recording medium (magnetic disk). Hereinafter, the formation of the servo pattern will be described using a magnetic tape as an example.

The servo pattern is generally formed along a longitudinal direction of the magnetic tape. As a method of control using a servo signal (servo control), timing-based servo (TBS), amplitude servo, or frequency servo is used.

As shown in European Computer Manufacturers Association (ECMA)-319, a timing-based servo system is used in a magnetic tape based on a linear tape-open (LTO) standard (generally referred to as an "LTO tape"). In this timing-based servo system, the servo pattern is configured by continuously disposing a plurality of pairs of magnetic stripes (also referred to as "servo stripes") not parallel to each other in a longitudinal direction of the magnetic tape. In the invention and the specification, a "timing-based servo pattern" refers to a servo pattern that enables head tracking in a servo system of a timing-based servo system. As described above, a reason for that the servo pattern is configured with one pair of magnetic stripes not parallel to each other is because a servo signal reading element passing on the servo pattern recognizes a passage position thereof. Specifically, one pair of the magnetic stripes are formed so that a gap thereof is continuously changed along the width direction of the magnetic tape, and a relative position of the servo pattern and the servo signal reading element can be recognized, by the reading of the gap thereof by the servo signal reading element. The information of this relative position can realize the tracking of a data track. Accordingly, a plurality of servo tracks are generally set on the servo pattern along the width direction of the magnetic tape.

The servo band is configured of a servo signal continuous in the longitudinal direction of the magnetic tape. A plurality of servo bands are normally provided on the magnetic tape. For example, the number thereof is 5 in the LTO tape. A region interposed between two adjacent servo bands is called a data band. The data band is configured of a plurality of data tracks and each data track corresponds to each servo track.

In the one embodiment, as shown in JP2004-318983A, information showing the number of servo band (also referred to as "servo band identification (ID)" or "Unique Data Band Identification Method (UDIM) information") is embedded in each servo band. This servo band ID is recorded by shifting a specific servo stripe among the plurality of pair of servo stripes in the servo band so that the position thereof is relatively deviated in the longitudinal direction of the magnetic tape. Specifically, the position of the shifted specific servo stripe among the plurality of pair of servo stripes is changed for each servo band. Accordingly, the recorded servo band ID becomes unique for each servo band, and therefore, the servo band can be uniquely specified by only reading one servo band by the servo signal reading element.

In a method of uniquely specifying the servo band, a staggered method as shown in ECMA-319 is used. In this staggered method, the plurality of groups of one pair of magnetic stripes (servo stripe) not parallel to each other which are continuously disposed in the longitudinal direction of the magnetic tape is recorded so as to be shifted in the longitudinal direction of the magnetic tape for each servo band. A combination of this shifted servo band between the adjacent servo bands is set to be unique in the entire magnetic tape, and accordingly, the servo band can also be uniquely specified by reading of the servo pattern by two servo signal reading elements.

In addition, as shown in ECMA-319, information showing the position in the longitudinal direction of the magnetic tape (also referred to as "Longitudinal Position (LPOS) information") is normally embedded in each servo band. This LPOS information is recorded so that the position of one pair of servo stripes are shifted in the longitudinal direction of the magnetic tape, in the same manner as the UDIM information. However, unlike the UDIM information, the same signal is recorded on each servo band in this LPOS information.

Other information different from the UDIM information and the LPOS information can be embedded in the servo band. In this case, the embedded information may be different for each servo band as the UDIM information, or may be common in all of the servo bands, as the LPOS information.

In addition, as a method of embedding the information in the servo band, a method other than the method described above can be used. For example, a predetermined code may be recorded by thinning out a predetermined pair among the group of pairs of the servo stripes.

A servo pattern forming head is also referred to as a servo write head. The servo write head includes pairs of gaps corresponding to the pairs of magnetic stripes by the number of servo bands. In general, a core and a coil are respectively connected to each of the pairs of gaps, and a magnetic field generated in the core can generate leakage magnetic field in the pairs of gaps, by supplying a current pulse to the coil. In a case of forming the servo pattern, by inputting a current pulse while causing the magnetic tape to run on the servo write head, the magnetic pattern corresponding to the pair of gaps is transferred to the magnetic tape, and the servo pattern can be formed. A width of each gap can be suitably set in accordance with a density of the servo patterns to be formed. The width of each gap can be set as, for example, equal to or smaller than 1 μm, 1 to 10 μm, or equal to or greater than 10 μm.

Before forming the servo pattern on the magnetic tape, a demagnetization (erasing) process is generally performed on the magnetic tape. This erasing process can be performed by applying a uniform magnetic field to the magnetic tape by using a DC magnet and an AC magnet. The erasing process includes direct current (DC) erasing and alternating current (AC) erasing. The AC erasing is performed by slowing decreasing an intensity of the magnetic field, while reversing a direction of the magnetic field applied to the magnetic tape. Meanwhile, the DC erasing is performed by adding the magnetic field in one direction to the magnetic tape. The DC erasing further includes two methods. A first method is horizontal DC erasing of applying the magnetic field in one direction along a longitudinal direction of the magnetic tape. A second method is vertical DC erasing of applying the magnetic field in one direction along a thickness direction of the magnetic tape. The erasing process may be performed with respect to all of the magnetic tape or may be performed for each servo band of the magnetic tape.

A direction of the magnetic field to the servo pattern to be formed is determined in accordance with the direction of erasing. For example, in a case where the horizontal DC erasing is performed to the magnetic tape, the formation of the servo pattern is performed so that the direction of the magnetic field and the direction of erasing becomes opposite to each other. Accordingly, the output of the servo signal obtained by the reading of the servo pattern can be increased. As disclosed in JP2012-053940A, in a case where the magnetic pattern is transferred to the magnetic tape subjected to the vertical DC erasing by using the gap, the servo signal obtained by the reading of the formed servo pattern has a unipolar pulse shape. Meanwhile, in a case where the magnetic pattern is transferred to the magnetic tape subjected to the horizontal DC erasing by using the gap, the servo signal obtained by the reading of the formed servo pattern has a bipolar pulse shape.

The magnetic tape is generally accommodated in a magnetic tape cartridge and the magnetic tape cartridge is mounted in a magnetic recording and reproducing device.

In the magnetic tape cartridge, the magnetic tape is generally accommodated in a cartridge main body in a state of being wound around a reel. The reel is rotatably comprised in the cartridge main body. As the magnetic tape cartridge, a single reel type magnetic tape cartridge including one reel in a cartridge main body and a twin reel type magnetic tape cartridge including two reels in a cartridge main body are widely used. In a case where the single reel type magnetic tape cartridge is mounted in the magnetic recording and reproducing device in order to record and/or reproduce data to the magnetic tape, the magnetic tape is drawn from the magnetic tape cartridge and wound around the reel on the magnetic recording and reproducing device side. A magnetic head is disposed on a magnetic tape transportation path from the magnetic tape cartridge to a winding reel. Sending and winding of the magnetic tape are performed between a reel (supply reel) on the magnetic tape cartridge side and a reel (winding reel) on the magnetic recording and reproducing device side. In the meantime, the magnetic head comes into contact with and slides on the surface of the magnetic layer of the magnetic tape, and accordingly, the recording and/or reproduction of the data is performed. With respect to this, in the twin reel type magnetic tape cartridge, both reels of the supply reel and the winding reel are provided in the magnetic tape cartridge. The magnetic tape cartridge may be any of single reel type magnetic tape cartridge and twin reel type magnetic tape cartridge. For other details of the magnetic tape cartridge, a well-known technology can be used.

Magnetic Recording and Reproducing Device

One embodiment of the invention relates to a magnetic recording and reproducing device including the magnetic recording medium and a magnetic head.

In the invention and the specification, the "magnetic recording and reproducing device" means a device capable of performing at least one of the recording of data on the magnetic recording medium or the reproducing of data recorded on the magnetic recording medium. Such a device is generally called a drive. The magnetic recording and reproducing device can be a sliding type magnetic recording and reproducing device. The sliding type magnetic recording and reproducing device is a device in which a surface of a magnetic layer and a magnetic head are in contact with each other and slide on each other, in a case of performing the recording of data on a magnetic recording medium and/or the reproducing of the recorded data.

The magnetic head included in the magnetic recording and reproducing device can be a recording head capable of performing the recording of data on the magnetic recording medium, and can also be a reproducing head capable of performing the reproducing of data recorded on the magnetic recording medium. In addition, in the embodiment, the magnetic recording and reproducing device can include both of a recording head and a reproducing head as separate magnetic heads. In another embodiment, the magnetic head included in the magnetic recording and reproducing device can also have a configuration of comprising both of an element for recording data (recording element) and an element for reproducing data (reproducing element) in one magnetic head. Hereinafter, the element for recording data and the element for reproducing are collectively referred to as "elements for data". As the reproducing head, a magnetic head (MR head) including a magnetoresistive (MR) element capable of reading data recorded on the magnetic recording medium with excellent sensitivity as the reproducing element is preferable. As the MR head, various well-known MR heads such as an Anisotropic Magnetoresistive (AMR) head, a Giant Magnetoresistive (GMR) head, or a Tunnel Magnetoresistive (TMR) can be used. In addition, the magnetic head which performs the recording of data and/or the reproducing of data may include a servo signal reading element. Alternatively, as a head other than the magnetic head which performs the recording of data and/or the reproducing of data, a magnetic head (servo head) comprising a servo signal reading element may be included in the magnetic recording and reproducing device. The magnetic head which performs the recording of data and/or reproducing of the recorded data (hereinafter, also referred to as a "recording and reproducing head") can include two servo signal reading elements, and each of the two servo signal reading elements can read two adjacent servo bands at the same time. One or a plurality of elements for data can be disposed between the two servo signal reading elements.

In the magnetic recording and reproducing device, the recording of data on the magnetic recording medium and/or the reproducing of data recorded on the magnetic recording medium can be performed by bringing the surface of the magnetic layer of the magnetic recording medium into contact with the magnetic head and sliding. The magnetic recording and reproducing device may include the magnetic recording medium according to the embodiment of the invention, and well-known technologies can be applied for the other configurations.

For example, in a case of recording data and/or reproducing the recorded data, first, tracking using a servo signal is performed. That is, as the servo signal reading element follows a predetermined servo track, the element for data is controlled to pass on the target data track. The movement of the data track is performed by changing the servo track to be read by the servo signal reading element in the tape width direction.

In addition, the recording and reproducing head can perform the recording and/or the reproducing with respect to other data bands. In this case, the servo signal reading element is moved to a predetermined servo band by using the UDIM information described above, and the tracking with respect to the servo band may be started.

ε-Iron Oxide Powder

The one embodiment of the invention relates to the ε-iron oxide powder in which the average particle size is 9.0 nm to 20.0 nm, a content of particles having a particle size smaller than 8.0 nm is less than 20.0% by mass, a content of particles having a particle size smaller than 6.0 nm is less than 5.0% by mass, and a content of particles having a particle size greater than 25.0 nm is less than 20.0% by mass.

For details of the ε-iron oxide powder, the above description regarding the ε-iron oxide powder included in the magnetic layer of the magnetic recording medium can be referred to.

EXAMPLES

Hereinafter, the invention will be described more specifically with reference to examples. However, the invention is not limited to embodiments shown in the examples. "Parts" and "%" in the following description indicate "parts by mass" and "% by mass", unless otherwise noted. "eq" indicates equivalent and a unit not convertible into SI unit. The following steps and evaluations were performed in an air atmosphere at 23° C.±1° C., unless otherwise noted.

Example 1

Producing of Ferromagnetic Powder (ε-Iron Oxide Powder)

3.6 g of ammonia aqueous solution having a concentration of 25% was added to a material obtained by dissolving 8.3 g of iron (III) nitrate nonahydrate, 1.25 g of gallium (III) nitrate octahydrate, 189 mg of cobalt (III) nitrate hexahydrate, 152 mg of titanium (III) sulfate, and 1.0 g of polyvinyl pyrrolidone (PVP) in 92.3 g of pure water, while stirring by using a magnetic stirrer, in an atmosphere under the conditions of an atmosphere temperature of 25° C., and the mixture was stirred for 2 hours still under the condition of the atmosphere temperature of 25° C. A citric acid aqueous solution obtained by dissolving 0.85 g of citric acid in 9.15 g of pure water was added to the obtained solution and stirred for 1 hour. The powder precipitated after the stirring was collected by centrifugation, washed with pure water, and dried in a heating furnace at a furnace inner temperature of 80° C.

800 g of pure water was added to the dried powder and the powder was dispersed in water again, to obtain a dispersion liquid. The obtained dispersion liquid was heated to a liquid temperature of 50° C., and 40 g of ammonia aqueous solution having a concentration of 25% was added dropwise while stirring. The stirring was performed for 1 hour while holding the liquid temperature of 50° C., and 13.3 mL of tetraethyl orthosilicate (TEOS) was added dropwise and stirred for 24 hours.

51 g of ammonium sulfate was added to the obtained reaction solution, the precipitated powder was collected by centrifugal separation, washed with pure water, and dried in a heating furnace at a furnace inner temperature of 80° C., and a precursor of ε-iron oxide powder was obtained.

The obtained powder of precursor was heated in a heating furnace at a furnace inner temperature (heat treatment temperature) of 1024° C. in the atmosphere for 4 hours.

The heat-treated powder was put into sodium hydroxide (NaOH) aqueous solution having a concentration of 4 mol/L, the liquid temperature was held at 70° C., stirring was performed for 24 hours, and accordingly, a silicon acid compound was removed from the heat-treated powder.

After that, by the centrifugal separation process, powder obtained by removing the silicon acid compound was collected and washed with pure water.

The powder after the washing was subjected to a classification treatment by the following method. In the classification treatment, among the particles included in the liquid subjected to centrifugation, particles having a small particle size were dispersed in the supernatant after centrifugation, and particles having a large particle size precipitated as a precipitate.

10 g of the powder after washing, 3.3 g of citric acid, 300 g of zirconia beads, and 50 g of pure water were put in a sealed container, and subjected to a dispersion treatment with a paint shaker for 3.5 hours. Then, 360 g of pure water was added to separate the beads and the liquid, and after centrifugation to precipitate the powder, the supernatant was removed. Next, 380 g of pure water was added, redispersion process was performed with a homogenizer, and the pH was adjusted to 9.5 with ammonia water having a concentration of 25% to obtain a dispersion liquid A in which the powder is dispersed.

This dispersion liquid A was subjected to the first centrifugation at 15,200 G (G: gravitational acceleration) for 22 minutes, and then the precipitate and the supernatant were separated by decantation. The obtained supernatant was subjected to a second centrifugation at 15,200 G for 20 minutes, and then the supernatant and the precipitate were separated by decantation. The obtained supernatant was subjected to a third centrifugation at 15,200 G for 100 minutes, and then the supernatant and the precipitate were separated by decantation. The pure water was put into the obtained precipitate and dispersed again with ultrasonic waves, and was subjected to a fourth centrifugation at 15,200 G for 120 minutes. After that, the supernatant and the precipitate were separated by decantation. The obtained precipitate was dried in a heating furnace at a furnace inner temperature of 95° C. for 6 hours.

The composition of the powder obtained after the drying was confirmed by Inductively Coupled Plasma-Optical Emission Spectrometry (ICP-OES), and Ga, Co, and Ti substitution type ε-iron oxide (composition: see Table 1) was obtained. Regarding the powder obtained after drying, an X-ray diffraction analysis was performed. The X-ray diffraction analysis was performed by scanning CuKα ray under the condition of a voltage of 45 kV and intensity of 40 mA and measuring an X-ray diffraction pattern under the following conditions. It was confirmed that the obtained ferromagnetic powder does not have a crystal structure of an α phase and a γ phase and has a crystal structure of a single phase which is an £ phase (ε-iron oxide type crystal structure) from the peak of the X-Ray diffraction pattern obtained by the X-ray diffraction analysis. That is, it was confirmed that the ε-iron oxide powder was produced.

PANalytical X'Pert Pro diffractometer, PIXcel detector
Soller slit of incident beam and diffraction beam: 0.017 radians
Fixed angle of dispersion slit: ¼ degrees
Mask: 10 mm
Scattering prevention slit: ¼ degrees
Measurement mode: continuous
Measurement time per 1 stage: 3 seconds
Measurement speed: 0.017 degrees per second
Measurement step: 0.05 degrees
Regarding each powder produced by the method which will be described later, the X-ray diffraction analysis was performed in the same manner as in Example 1, each powder does not have a crystal structure of an α phase and a γ phase and has a crystal structure of a single phase which is an ε phase (ε-iron oxide type crystal structure). That is, ε-iron oxide powder was confirmed.

The composition of the powder produced by the method which will be described later was confirmed by Inductively Coupled Plasma-Optical Emission Spectrometry (ICP-OES), and Ga, Co, and Ti substitution type ε-iron oxide having a composition shown in Table 1 was obtained.

Manufacturing of Magnetic Recording Medium (Magnetic Tape)

(1) List of Magnetic Layer Forming Composition

Magnetic Liquid
  Ferromagnetic powder produced above: 100.0 parts
  $SO_3Na$ group-containing polyurethane resin: 14.0 parts
    (Weight-average molecular weight: 70,000, $SO_3Na$ group: 0.4 meq/g)
  Cyclohexanone: 150.0 parts
  Methyl ethyl ketone: 150.0 parts
  Oleic acid: 2.0 parts
Abrasive Solution
  Abrasive solution A
  Alumina abrasive (average particle size: 100 nm): 3.0 parts
  $SO_3Na$ group-containing polyurethane resin: 0.3 parts
    (Weight-average molecular weight: 70,000, $SO_3Na$ group: 0.3 meq/g)
  Cyclohexanone: 26.7 parts
  Abrasive solution B
  Diamond abrasive (average particle size: 100 nm): 1.0 part
  $SO_3Na$ group-containing polyurethane resin: 0.1 parts
    (Weight-average molecular weight: 70,000, $SO_3Na$ group: 0.3 meq/g)
  Cyclohexanone: 26.7 parts
Silica Sol
  Colloidal silica (average particle size: 100 nm): 0.2 parts
  Methyl ethyl ketone: 1.4 parts
Other Components:
  Stearic acid: 2.0 parts
  Butyl stearate: 6.0 parts
  Polyisocyanate (CORONATE manufactured by Tosoh Corporation): 2.5 parts
Finishing Additive Solvent
  Cyclohexanone: 200.0 parts
  Methyl ethyl ketone: 200.0 parts (2) List of Non-Magnetic Layer Forming Composition Non-magnetic inorganic powder: (α-iron oxide): 100.0 parts
  average particle size: 10 nm
  average aspect ratio: 1.9
  BET (Brunauer-Emmett-Teller) specific surface area: 75 $m^2/g$
Carbon black (average particle size: 20 nm): 25.0 parts
$SO_3Na$ group-containing polyurethane resin: 18.0 parts
  (Weight-average molecular weight: 70,000, $SO_3Na$ group: 0.2 meq/g)
Stearic acid: 1.0 part
Cyclohexanone: 300.0 parts
Methyl ethyl ketone: 300.0 parts (3) List of Back Coating Layer Forming Composition Non-magnetic inorganic powder: (α-iron oxide): 80.0 parts
  average particle size: 0.15 μm
  average aspect ratio: 7
  BET specific surface area: 52 $m^2/g$
Carbon black (average particle size: 20 nm): 20.0 parts
Vinyl chloride copolymer: 13.0 parts
Sulfonic acid group-containing polyurethane resin: 6.0 parts
Phenylphosphonic acid: 3.0 parts
Cyclohexanone: 155.0 parts
Methyl ethyl ketone: 155.0 parts
Stearic acid: 3.0 parts
Butyl stearate: 3.0 parts
Polyisocyanate: 5.0 parts
Cyclohexanone: 200.0 parts (4) Manufacturing of Magnetic Tape Various components of the magnetic liquid were dispersed to prepare a magnetic liquid. The dispersion process was performed for 24 hours using a batch type vertical sand mill. As dispersion beads, zirconia beads having a particle diameter of 0.5 mm were used.

The abrasive solution was prepared by the following method. A dispersion liquid prepared by dispersing various components of the abrasive solution A and a dispersion liquid prepared by dispersing various components of the abrasive solution B were prepared. After mixing these two kinds of dispersion liquids, an ultrasonic dispersion process was performed for 24 hours with a batch type ultrasonic device (20 kHz, 300 W) to prepare an abrasive solution.

The magnetic liquid and the abrasive solution obtained as described above were mixed with other components (silica sol, other components and the finishing additive solvent) and subjected to process (ultrasonic dispersion) with a batch type ultrasonic device (20 kHz, 300 W) for 30 minutes. After that, the obtained mixture was filtered with a filter having a hole diameter of 0.5 μm, and a magnetic layer forming composition was prepared.

For the non-magnetic layer forming composition, the various components were dispersed by using a batch type vertical sand mill for 24 hours. As dispersion beads, zirconia beads having a particle diameter of 0.1 mm were used. The obtained dispersion liquid was filtered with a filter having a hole diameter of 0.5 μm and a non-magnetic layer forming composition was prepared.

For the back coating layer forming composition, the various components described above excluding the lubricant (stearic acid and butyl stearate), polyisocyanate, and 200.0 parts of cyclohexanone were kneaded and diluted by an open kneader. Then, the obtained mixed liquid was subjected to a dispersion process of 12 passes, with a transverse beads mill dispersing device by using zirconia beads having a particle diameter of 1 mm, by setting a bead filling percentage as 80 volume %, a circumferential speed of rotor distal end as 10 m/sec, and a retention time for 1 pass as 2 minutes. After that, the remaining components were added into the obtained dispersion liquid and stirred with a dissolver. The obtained dispersion liquid described above was filtered with a filter having an hole diameter of 1 μm and a back coating layer forming composition was prepared.

After that, the non-magnetic layer forming composition was applied and dried on a surface of a biaxial stretching polyethylene naphthalate support having a thickness of 5.0 μm so that a thickness after drying is 100 nm, and the magnetic layer forming composition was applied so that a thickness after drying is 70 nm, a coating layer was formed. While this coating layer is wet, a homeotropic alignment process was performed by applying a magnetic field having a magnetic field strength of 0.6 T in a direction vertical to the surface of the coating layer, and the coating layer was dried. After that, the back coating layer forming composition was applied to a surface of the support on a side opposite to the surface where the non-magnetic layer and the magnetic layer are formed, so that the thickness after drying becomes 0.4 μm, and dried, and accordingly, a back coating layer was formed.

Then, a surface smoothing treatment (calender process) was performed with a calender configured of only a metal roll, at a speed of 100 m/min, linear pressure of 294 kN/m, and a surface temperature of a calender roll of 97° C., and the heating treatment was performed in the environment of the atmosphere temperature of 70° C. for 36 hours. After the heating treatment, the slitting was performed to have a width of ½ inches, and a magnetic tape was obtained. 1 inch=0.0254 meters Comparative Example 1

A magnetic tape was manufactured in the same manner as in Example 1, except for the following points.

In a case of preparing the ε-iron oxide powder, the added amount of gallium (III) nitrate octahydrate was set as 0.34 g, cobalt (III) nitrate hexahydrate and titanium (III) sulfate were not added, and the heat treatment of the powder of the precursor was performed at a heat treatment temperature of 1004° C. for 4 hours. In the classification treatment, the first and second centrifugations were not performed, the third centrifugation was performed by setting the conditions of the third centrifugation at 15,200 G for 600 minutes, and the precipitate separated from the supernatant was dried in a heating furnace at a furnace inner temperature of 95° C. for 6 hours, without performing the fourth centrifugation, to obtain ε-iron oxide powder.

Example 2

A magnetic tape was manufactured in the same manner as in Comparative Example 1, except for the following points.

In a case of preparing the ε-iron oxide powder, the precursor powder was heat-treated at a heat treatment temperature of 1006° C. for 4 hours. In the classification process, the first centrifugation and the subsequent second centrifugation was performed on the dispersion A, and the conditions of the third centrifugation were set as 15,200 G and 600 minutes, in the same manner as in Example 1. After the third centrifugation, the precipitate separated from the supernatant was dried in a heating furnace at a furnace inner temperature of 95° C. for 6 hours, without performing the fourth centrifugation, to obtain ε-iron oxide powder.

Example 3

A magnetic tape was manufactured in the same manner as in Example 1, except for the following points.

In a case of manufacturing the ε-iron oxide powder, the added amount of gallium (III) nitrate octahydrate was set as 1.44 g, and the heat treatment of the powder of the precursor was performed at a heat treatment temperature of 1032° C. for 4 hours. In the classification treatment, the first centrifugation condition for the dispersion liquid A was set as 15,200 G for 20 minutes, the second centrifugation was performed in the same manner as in Example 1, the supernatant separated from the precipitate after the second centrifugation was subjected to the third centrifugation at 15,200 G for 480 minutes, and then classification treatment was performed in the same manner as in Example 1.

Comparative Example 2

In a case of preparing the ε-iron oxide powder, a magnetic tape was manufactured in the same manner as in Example 3, except that heat treatment of the precursor powder was performed at a heat treatment temperature of 1034° C. for 4 hours.

Example 4

A magnetic tape was manufactured in the same manner as in Example 1, except for the following points.

In the classification treatment, the first centrifugation condition for the dispersion liquid A was set as 15,200 G for 15 minutes, and the second centrifugation condition was 15,200 G for 10 minutes. Then, the classification treatment was performed in the same manner as in Example 1.

Comparative Example 3

A magnetic tape was manufactured in the same manner as in Example 1, except for the following points.

In the classification treatment, the first centrifugation condition for the dispersion liquid A was set as 15,200 G for 10 minutes, and the second centrifugation condition was set as 15200 G for 5 minutes, and the supernatant was taken out. Then, the classification treatment was performed in the same manner as in Example 1.

Example 5

A magnetic tape was manufactured in the same manner as in Example 1, except for the following points.

In a case of manufacturing the ε-iron oxide powder, the added amount of gallium (III) nitrate octahydrate was set as 1.15 g, and the heat treatment of the powder of the precursor was performed at a heat treatment temperature of 1022° C. for 4 hours. The classification treatment was performed in the same manner as in Example 1, except that the third centrifugation condition was set as 15,200 G for 90 minutes and the fourth centrifugation condition was set as 15,200 G for 100 minutes.

Comparative Example 4

A magnetic tape was manufactured in the same manner as in Example 1, except for the following points.

In a case of manufacturing the ε-iron oxide powder, the added amount of gallium (III) nitrate octahydrate was set as 1.15 g, and the heat treatment of the powder of the precursor was performed at a heat treatment temperature of 1022° C. for 4 hours. The classification treatment was performed in the same manner as in Example 1, except that the first centrifugation condition was set as 15,200 G for 25 minutes, the second centrifugation condition was set as 15,200 G for 20 minutes, the third centrifugation condition was set as 15,200 G for 120 minutes, and the fourth centrifugation condition was set as 15,200 G for 150 minutes.

Example 6

A magnetic tape was manufactured in the same manner as in Example 1, except for the following points.

The classification treatment was performed in the same manner as in Example 1, except that the first centrifugation condition was set as 15,200 G for 22 minutes, the second centrifugation condition was set as 15,200 G for 22 minutes, the third centrifugation condition was set as 15,200 G for 150 minutes, and the fourth centrifugation condition was set as 15,200 G for 180 minutes.

Comparative Example 5

A magnetic tape was manufactured in the same manner as in Example 1, except for the following points.

The classification treatment was performed in the same manner as in Example 1, except that the first centrifugation condition was set as 15,200 G for 12 minutes, the second centrifugation condition was set as 15,200 G for 15 minutes, the third centrifugation condition was set as 15,200 G for 160 minutes, and the fourth centrifugation condition was set as 15,200 G for 150 minutes.

Comparative Example 6

A magnetic tape was manufactured in the same manner as in Example 1, except that ferromagnetic powder in a case of manufacturing the magnetic liquid was changed to hexagonal barium ferrite powder (in Table 1, "BaFe").

Evaluation Method (1) Average Particle Size and Contents of Particles of Various Particle Sizes Regarding each ferromagnetic powder used in the examples and the comparative examples, an average particle size, a content of particles having a particle size smaller than 8.0 nm, a content of particles having a particle size smaller than 6.0 nm, and a content of particles having a particle size greater than 25.0 nm were obtained by the method described above using a transmission electron microscope H-9000 manufactured by Hitachi, Ltd. as the transmission electron microscope, and image analysis software KS-400 manufactured by Carl Zeiss as the image analysis software.

(2) Electromagnetic Conversion Characteristics (Initial Stage of Running and after Repeated Running)

Magnetic signals were recorded on the magnetic tapes of the examples and comparative examples in a tape longitudinal direction under the following conditions. Each magnetic tape after recording was caused to run for a total of 600 passes, and the magnetic signals recorded in each pass were reproduced by the MR head. The frequency of the reproduced signal was analyzed using a spectrum analyzer manufactured by Shibasoku Co. Ltd., and the noise integrated in the third pass (initial stage of running) and the 600th pass (after repeated running) in the range of 0 to 600 kfci was evaluated according to the following evaluation standard. The unit kfci is a unit of the linear recording density (cannot be converted into the SI unit system), and fci is flux change per inch.

Recording and Reproduction Conditions
    Recording: Recording track width 5 μm
    Recording gap 0.17 μm
    Head saturated magnetic flux density Bs 1.8 T
    Recording wavelength: 300 kfci
    Reproduction: Reproduction track width 0.4 μm
    Distance between shields (sh-sh distance) 0.08 μm
    Evaluation Standard
    5: Substantially no noise, a signal is excellent, no error is observed.
    4: A degree of noise is small and a signal is excellent.
    3: The signal is good although noise is observed.
    2: A degree of noise is great and a signal is unclear.
    1: Noise and signal cannot be distinguished or cannot be recorded.

(3) Prevention of Decrease in Reproduction Output

A recording head (metal-in-gap (MIG) head, gap length of 0.17 μm, 1.8 T) and a reproducing head (Giant magnetoresistive (GMR) head, reproducing track width of 0.4 μm) were attached to a loop tester to obtain a test device.

In the above-described test device, a signal having a linear recording density of 200 kfci was recorded on each of the magnetic tapes of the example and the comparative example, and then the recorded signal was continuously reproduced, and a reproduction output attenuation ratio (unit:%/Decade) from the recording to the reproduction was measured. The smaller the numerical value (absolute value) of the attenuation rate, the more the decrease in the reproduction output is suppressed. The degree of prevention of the decrease in the reproduction output was evaluated according to the following evaluation standard.

Evaluation Standard
    4: −0.5%/decade or more and less than −0.3%/decade
    3: −0.8%/decade or more and less than −0.5%/decade
    2: −1.1%/decade or more and less than −0.8%/decade
    1: Less than −1.1%/decade The results from the above evaluation are shown in Table 1.

TABLE 1

| | Compositional Formula $Ga_xCo_yTi_zFe_{(2-x-y-z)}O_3$ | | | Average particle size (nm) | Content (%) | | | Electromagnetic conversion characteristics | | Prevention of decrease in reproduction output |
|---|---|---|---|---|---|---|---|---|---|---|
| | | | | | Average particle size smaller than 8.0 nm | Average particle size smaller than 6.0 nm | Average particle size greater than 25.0 nm | Initial stage of running | After repeated running | |
| | Ga x | Co y | Ti z | | | | | | | |
| Example 1 | 0.26 | 0.05 | 0.05 | 12.4 | 16.0 | 4.4 | 17.0 | 5 | 4 | 4 |
| Comparative Example 1 | 0.07 | 0.00 | 0.00 | 8.3 | 18.0 | 4.9 | 11.0 | 1 | 1 | 1 |
| Example 2 | 0.07 | 0.00 | 0.00 | 9.3 | 17.6 | 4.0 | 13.0 | 4 | 3 | 3 |
| Example 3 | 0.30 | 0.05 | 0.05 | 19.5 | 13.0 | 4.0 | 11.0 | 3 | 4 | 4 |
| Comparative Example 2 | 0.30 | 0.05 | 0.05 | 21.2 | 13.0 | 4.0 | 11.0 | 2 | 2 | 4 |
| Example 4 | 0.26 | 0.05 | 0.05 | 12.5 | 19.5 | 4.3 | 16.0 | 4 | 4 | 3 |
| Comparative Example 3 | 0.26 | 0.05 | 0.05 | 12.1 | 21.0 | 4.2 | 17.0 | 3 | 2 | 3 |
| Example 5 | 0.24 | 0.05 | 0.05 | 11.3 | 18.2 | 4.8 | 16.0 | 3 | 3 | 3 |
| Comparative Example 4 | 0.24 | 0.05 | 0.05 | 11.2 | 18.4 | 5.6 | 12.0 | 3 | 3 | 2 |

TABLE 1-continued

| | Compositional Formula $Ga_xCo_yTi_zFe_{(2-x-y-z)}O_3$ | | | Average particle size (nm) | Content (%) | | | Electromagnetic conversion characteristics | | Prevention of decrease in reproduction output |
|---|---|---|---|---|---|---|---|---|---|---|
| | | | | | Average particle size smaller than 8.0 nm | Average particle size smaller than 6.0 nm | Average particle size greater than 25.0 nm | Initial stage of running | After repeated running | |
| | Ga x | Co y | Ti z | | | | | | | |
| Example 6 | 0.26 | 0.05 | 0.05 | 12.6 | 13.0 | 4.0 | 19.3 | 3 | 3 | 4 |
| Comparative Example 5 | 0.26 | 0.05 | 0.05 | 12.7 | 12.1 | 4.0 | 21.4 | 2 | 3 | 3 |
| Comparative Example 6 | BaFe | | | 16.0 | 15.0 | 4.9 | 17.6 | 2 | 3 | 2 |

In Table 1, in comparison of the magnetic tape including the ε-iron oxide powder in the magnetic layer, in the magnetic tapes of Examples 1 to 6, excellent electromagnetic conversion characteristics at the initial stage of running and after repeated running were obtained and a decrease in reproduction output was prevented.

In addition, in the comparison with the magnetic tape of Comparative Example 6 in which the magnetic layer includes a ferromagnetic powder (hexagonal barium ferrite powder) other than the ε-iron oxide powder, in the magnetic tape including the ε-iron oxide powder in the magnetic layer, it can be confirmed that controlling the average particle size and the contents of the particles of various particle sizes in the ranges described above contribute to the improvement of the electromagnetic conversion characteristics at the initial stage of running and after repeated running and the prevention of a decrease in reproduction output.

One embodiment of the invention is effective in a technical field of a magnetic recording medium for high-density recording.

What is claimed is:

1. A magnetic recording medium comprising a non-magnetic support; and a magnetic layer including a ferromagnetic powder,
   wherein the ferromagnetic powder is an ε-iron oxide powder having an average particle size of 9.0 nm to 20.0 nm, and
   in the ε-iron oxide powder,
   a content of particles having a particle size smaller than 8.0 nm is 10.0% by mass or more and less than 20.0% by mass,
   a content of particles having a particle size smaller than 6.0 nm is 3.5% by mass or more and less than 5.0% by mass, and
   a content of particles having a particle size greater than 25.0 nm is 10.0% by mass or more and less than 20.0% by mass.

2. The magnetic recording medium according to claim 1, wherein the ε-iron oxide powder contains one or more kinds of element selected from the group consisting of a gallium element, a cobalt element, and a titanium element.

3. The magnetic recording medium according to claim 1, further comprising:
   a non-magnetic layer including a non-magnetic powder between the non-magnetic support and the magnetic layer.

4. The magnetic recording medium according to claim 1, further comprising:
   a back coating layer including a non-magnetic powder on a surface of the non-magnetic support opposite to a surface provided with the magnetic layer.

5. The magnetic recording medium according to claim 1, wherein the magnetic recording medium is a magnetic tape.

6. A magnetic recording and reproducing device comprising:
   a magnetic recording medium; and
   a magnetic head,
   wherein the magnetic recording medium is a magnetic recording medium comprising a non-magnetic support; and a magnetic layer including a ferromagnetic powder,
   wherein the ferromagnetic powder is an ε-iron oxide powder having an average particle size of 9.0 nm to 20.0 nm, and
   in the ε-iron oxide powder,
   a content of particles having a particle size smaller than 8.0 nm is 10.0% by mass or more and less than 20.0% by mass,
   a content of particles having a particle size smaller than 6.0 nm is 3.5% by mass or more and less than 5.0% by mass, and
   a content of particles having a particle size greater than 25.0 nm is 10.0% by mass or more and less than 20.0% by mass.

7. The magnetic recording and reproducing device according to claim 6,
   wherein the ε-iron oxide powder contains one or more kinds of element selected from the group consisting of a gallium element, a cobalt element, and a titanium element.

8. An ε-iron oxide powder,
   wherein an average particle size is 9.0 nm to 20.0 nm,
   a content of particles having a particle size smaller than 8.0 nm is 10.0% by mass or more and less than 20.0% by mass,
   a content of particles having a particle size smaller than 6.0 nm is 3.5% by mass or more and less than 5.0% by mass, and
   a content of particles having a particle size greater than 25.0 nm is 10.0% by mass or more and less than 20.0% by mass.

9. The ε-iron oxide powder according to claim 8,
   wherein the ε-iron oxide powder includes one or more kinds of element selected from the group consisting of a gallium element, a cobalt element, and a titanium element.

* * * * *